(12) United States Patent
Lin

(10) Patent No.: US 8,287,137 B2
(45) Date of Patent: Oct. 16, 2012

(54) PROJECTOR APPARATUS WITH MULTI-LIGHT SOURCES AND A LIGHT COUPLING MODULE THEREOF

(75) Inventor: Hung-Ying Lin, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 733 days.

(21) Appl. No.: 11/620,609

(22) Filed: Jan. 5, 2007

(65) Prior Publication Data

US 2007/0268464 A1 Nov. 22, 2007

(30) Foreign Application Priority Data

May 16, 2006 (TW) .............................. 95117250 A

(51) Int. Cl.
*G03B 21/20* (2006.01)
(52) U.S. Cl. ............... 353/85; 353/30; 353/38; 353/81; 353/98; 353/99; 353/119; 362/297
(58) Field of Classification Search ................ 353/81, 353/84, 85, 98, 31, 94, 99, 30, 37, 38, 119, 353/122; 348/742, 743, 771; 349/5, 7, 8, 349/9; 359/630, 618, 640; 313/113; 362/297–298, 362/343, 346, 347, 299, 302
See application file for complete search history.

(56) References Cited

U.S. PATENT DOCUMENTS

| | | | |
|---|---|---|---|
| 5,602,679 A * | 2/1997 | Dolgoff et al. .................. 359/640 |
| 5,765,934 A * | 6/1998 | Okamori et al. ................. 353/94 |
| 6,196,699 B1 * | 3/2001 | Stanton .......................... 362/235 |
| 6,224,217 B1 * | 5/2001 | Tanaka ............................ 353/94 |
| 6,252,636 B1 * | 6/2001 | Bartlett .......................... 348/743 |
| 6,488,379 B2 * | 12/2002 | Kane .............................. 353/94 |
| 6,517,212 B2 * | 2/2003 | Satou ............................... 353/99 |
| 6,877,882 B1 * | 4/2005 | Haven et al. .................. 362/308 |
| 6,886,943 B1 * | 5/2005 | Greenberg et al. ............. 353/94 |
| 6,924,849 B1 * | 8/2005 | Clifton et al. ..................... 349/5 |
| 7,055,967 B2 * | 6/2006 | Bierhuizen ...................... 353/98 |
| 7,095,547 B2 * | 8/2006 | Aubuchon et al. ........... 359/291 |
| 7,201,498 B2 | 4/2007 | Shimaoka et al. |
| 7,261,422 B2 * | 8/2007 | Lin ................................. 353/33 |
| 7,352,119 B2 * | 4/2008 | Rehn ............................. 313/113 |
| 7,437,034 B2 * | 10/2008 | Gerets et al. ................... 385/36 |
| 2003/0117595 A1 * | 6/2003 | Li et al. .......................... 353/31 |
| 2004/0252285 A1 * | 12/2004 | Lang et al. ..................... 353/94 |
| 2006/0268417 A1 * | 11/2006 | Penn et al. .................... 359/618 |
| 2006/0285087 A1 * | 12/2006 | Huang ............................. 353/94 |

(Continued)

FOREIGN PATENT DOCUMENTS

| | | |
|---|---|---|
| CN | 1646983 | 7/2005 |
| JP | 2001-268588 | 9/2001 |

*Primary Examiner* — Georgia Y Epps
*Assistant Examiner* — Sultan Chowdhury
(74) *Attorney, Agent, or Firm* — Patterson Thuente Christensen Pedersen, P.A.

(57) ABSTRACT

A projector apparatus with multi-light sources and a light coupling module thereof are disclosed. The projector with multi-light sources comprises a light incident region, a light tunnel, a color wheel, a light coupling module, and a plurality of light sources, all disposed in the light incident region. The light coupling module comprises a light coupling device, a light gathering device, and a reflection device. The light sources provide a plurality of light beams, which are substantially coupled into a single light beam by the light coupling device. The single light beam travels through the color wheel and the light tunnel through the light gathering device and light reflection device.

21 Claims, 8 Drawing Sheets

U.S. PATENT DOCUMENTS

2007/0165185 A1* 7/2007 Chen ................................ 353/20
2008/0143971 A1* 6/2008 Dewald ........................... 353/31
2008/0278689 A1* 11/2008 Read et al. ........................ 353/7
2009/0027631 A1* 1/2009 Liu et al. ......................... 353/84

* cited by examiner

PROJECTOR APPARATUS WITH MULTI-LIGHT SOURCES AND A LIGHT COUPLING MODULE THEREOF

This application claims priority to Taiwan Patent Application No. 095117250 filed on May 16, 2006, the disclosures of which are incorporated herein by reference in its entirety.

CROSS-REFERENCES TO RELATED APPLICATIONS

Not applicable.

BACKGROUND OF THE INVENTION

1. Field of the Invention

The present invention relates to an optical projector apparatus; more specifically, it relates to a projector apparatus with multi-light sources and a light coupling module thereof.

2. Descriptions of the Related Art

Nowadays, projector apparatus products, such as digital light processing (DLP) projector apparatuses, liquid crystal display (LCD) projector apparatuses, and liquid crystal on silicon (LCOS) projector apparatuses, are diversified for different customers. For example, in the popular DLP projector apparatus, a micro-electro-mechanical system (MEMS) which adopts a digital micromirror device (DMD) developed by Texas Instruments (TI) to serve as a technical base. In general, the DLP projector apparatus follows these imaging principles: (1) when a light projects from a light source, it travels through a color wheel and then proceeds with a color separation procedure. This procedure could divide light into plural colors and then enters through a light tunnel in optical engine to form a uniformed light; (2) thereafter, DMD receives image input signals which can drive micromirrors of DMD rotating to project correct light and images onto the projection lens; (3) finally, images will be displayed onto a screen along the projecting direction of the projection lens. In comparison to other projector apparatuses that are created using other principles, DLP projector apparatuses have advantages including high brightness quality, color reproducibility, contrast, and small size.

Because the DLP projector apparatus has excellent image presentation, many manufacturers have tried to develop the DLP projector apparatus and its accessories to achieve perfect projection quality. Generally speaking, the DLP projector apparatus should meet requirements that include high brightness quality and large scale projection while presenting images. As a result, it is essential to adopt a light coupling system with dual light sources in the DLP projector apparatus to enhance its image brightness.

As mentioned above (referring to FIG. 1), in a typical optical engine structure with a single light source, a light beam projects from a light source 11 and enters into a light tunnel 14 after its color is separated by the color wheel 15. The color separated light beam is homogenized and transmitted to a rear end of the optical engine 10, by processing the optical engine 10. In the end, an image is projected along a projection direction 17 by a projection lens 16. It is noted that the light beam which travels through the color wheel 15 needs to be a single light beam for color separation.

As mentioned above, in FIG. 2, the two light beams provided by the two light sources 11, 12 must be coupled into a single light beam using a proper light coupling mechanism. Only then would the coupled single light beam be able to travel through the color wheel and enter the single light tunnel. Otherwise, a plurality of light tunnels is necessary to receive a plurality of different light beams provided by different light sources. Under the latter circumstances, the color separation procedure cannot be performed before the light beam is homogenized by the light tunnel because the light beams have not been coupled yet. Thus, in considering the configuration of the above-mentioned elements, the color wheel must be disposed at the rear of the light tunnel so that the light beam is able to enter the light tunnel first. Then, the color separation procedure can follow after the homogenized lights are coupled by some mechanism. However, the single light source structure, shown in FIG. 1, can not share the optical engine 10 with the dual light sources structure, shown in FIG. 2, because the relative positions between the light tunnel 14 and the color wheel 15 are different in these two cases.

Using a prism 13 as another example of the adoption of dual light sources 11, 12 structure, after the dual light beams travel through the prism 13, the beams would approximately couple into a single light beam and travel first through the color wheel and then through the light tunnel. In this case, these light beams from the dual light sources 11, 12 have to travel very closely to the vertex 131 of the prism 13, and accordingly, the prism 13 must be adjusted outwardly by a distance if the light sources do not move inwardly. In addition, the single light beam must run across a space which is used to dispose the color wheel 15 before actually reaching it. The intensity of the light beam is decayed first when coupling, and even worse, the distance across that space may cause a further decrease of the intensity. That is, the light coupling efficiency decreases and image brightness and color are adversely affected as well.

In DLP projector apparatuses, elliptic lamps usually serve as the light sources 11, 12 in a dual light projection system, as shown in FIG. 3A. The two opposite elliptic lamps build up a hypothetic connection line between the centers (normally where the bulbs thereof resides), in which the hypothetic connection line is substantially parallel to the projection direction 17 (i.e. y axis) of the projection lens 16. Referring to FIG. 3B, the elliptic lamps, generally adopted by the industry, create a high temperature region (assuming the area encompassed as reference numeral 18) due to the heat generated by the blaze of the lamps 11, 12. The high temperature region 18 then gradually arises to a top portion between the two electrodes as a result of the upwards rising heat under buoyancy efficiency. To assure a normal service life for the electrodes of the elliptic lamps, manufacturers usually request users not to tilt the projector apparatus over a certain angle β (normally 20 degrees) upward or downward as shown in FIG. 3C. when in use to avoid high temperature and damage to the electrodes. More specifically, if the projection lens 16 are tilted up or down over a certain degree β, as shown in FIG. 3C, one of the lamps may go beyond a critical point of safety and overlaps with the high temperature region 18. This is a possible serious defect to the lamps 11, 12 only under a relatively short period of operating time.

In order to enhance performance and extend the life cycle of the dual light sources in the DLP projector apparatus, it is necessary to redesign a projector apparatus and a light coupling module thereof both adopted by a projector system with a single light source or multi-light sources.

SUMMARY OF THE INVENTION

The primary objective of this invention is to provide a projector apparatus with multi-light sources. The projector apparatus with multi-light sources comprises a light incident region, a light tunnel, a color wheel, a light coupling module, and a plurality of light sources, all of which are disposed in the light incident region. The light coupling module comprises a light coupling device, a light gathering device, and a reflection device. The light sources provide a plurality of light beams, which are substantially coupled into a single light beam by the light coupling device. This single light beam travels through both the color wheel and the light tunnel through the light gathering device and the reflection device.

Another objective of this invention is to provide a light coupling module adapted in a projector apparatus with multi-light sources. The projector apparatus with multi-light sources comprises a light incident region, a light tunnel, a color wheel, a light coupling module, and a plurality of light sources, all disposed in the light incident region. The light coupling module comprises a light coupling device, a light gathering device, and a reflection device. The plurality of light sources provides a plurality of light beams, which are substantially coupled into a single light beam by the light coupling device. This single light beam travels through both the color wheel and the light tunnel through the light gathering device and light reflection device.

Both the projector apparatus with multi-light sources and the light coupling module thereof disclosed in the present invention can share an optical engine with the original single lamp structure. The color wheel can be disposed on the front end of the light tunnel, and thus, a better color display can be performed. Furthermore, because the light sources are substantially orthogonal to the projection direction, the light sources will not be affected if the projector is tilted when in use. These designs not only enhance coupling efficiency, intensity, and uniformity of the light sources, but they also efficiently extend the service life of the light sources.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention focuses on a light coupling module and a projector apparatus with multi-light sources that applies the light coupling module. The following description relates primarily to the light coupling module of the projector apparatus, the light path, peripheral accessories and the configuration thereof. Other components and basic techniques of the projector apparatus are not given here.

Figure 4:
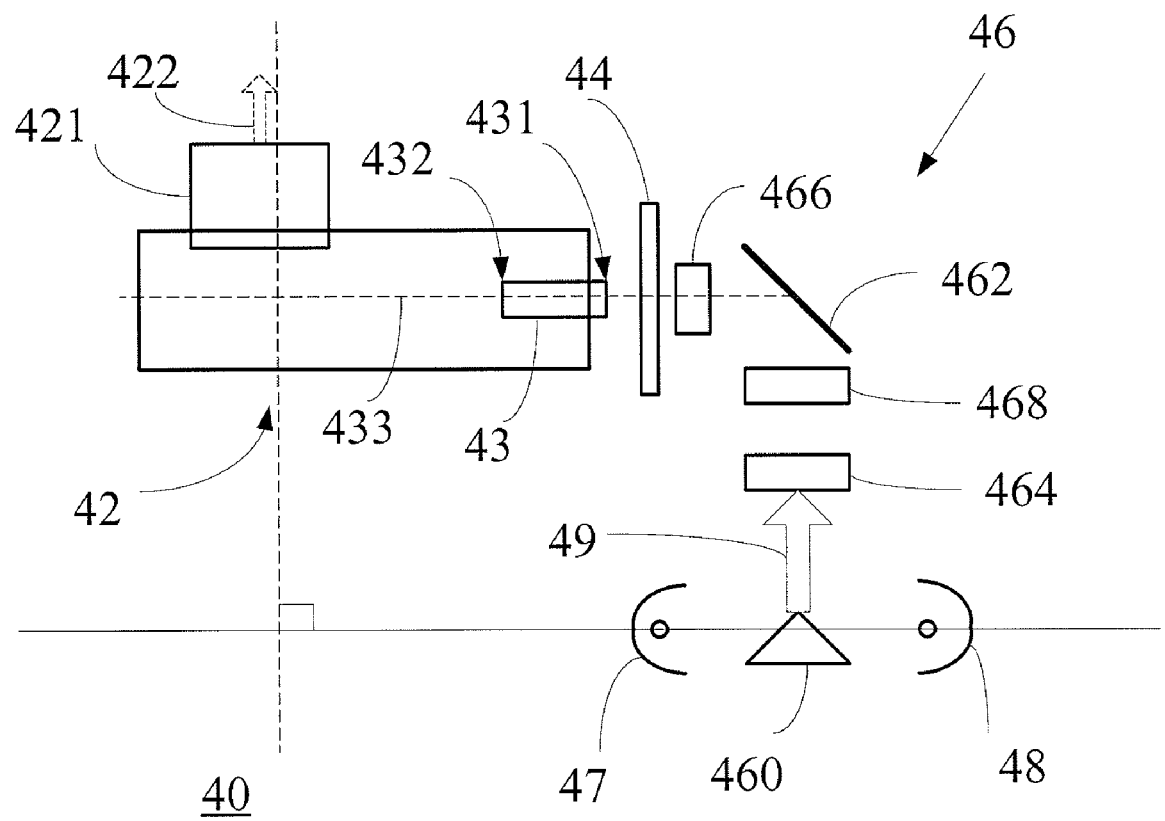
FIG. 4 schematically illustrates a projector apparatus with multi-light sources of the present invention.

With reference to FIG. 4, the projector apparatus 40 primarily comprises an optical engine 42 which has a light incident region and an image outgoing region. The projector apparatus 40 further comprises a light tunnel 43, a color wheel 44, a light coupling module 46, and at least two light sources 47, 48, all disposed in the light incident region. The projection lens 421, are disposed in the image outgoing region. High intensity discharge (HID) elliptic lamps are the preferred light sources.

The light tunnel 43 comprises a front end 431 and a rear end 432 opposite to the front end 431. The light beam which travels through the color wheel 44 and the light tunnel 43 in the light incident region will proceed to image processing in the optical engine 42. The processed image is projected outwards from the projection lens 421 along a projection direction 422 (as the hypothetic line shown in the drawing).

Preferably, the light coupling module 46 of the present invention comprises a coupling prism 460, a mirror 462, a first condensing lens 464, and a second condensing lens 466. In the preferred embodiment of the present invention, the light coupling module 46 further comprises a third condensing lens 468, disposed between the first condensing lens 464 and the mirror 462. Preferably, the position of the third condensing lens 468 is adjustable according to the needs of the extent to control the focus of the coupled light beam 49 that is coupled by the prism 460. Likewise, the position of the prism 460 should be adjustable to control the light coupling intensity of the incident lights that are projected from the light sources 47, 48 and enter into the prism 460. People skilled in this field may realize that the prism 460, the first condensing lens 464, the second condensing lens 466, and the third condensing lens 468 can change the quantities thereof according to requirements. They can be designed solely or wholly as adjustable components to control the focusing position and light intensity thereof. Moreover, the condensing lens 464, 466, and 468 are selectively disposed at the front end, the rear end, or both the front and the rear end of the mirror 462 because those manners can achieve the purposes of light convergence.

Specifically, the prism 460 couples the light beams that it receives from the light source 47, 48 and changes the proceeding direction to generate a coupled light beam 49. After the coupled light beam 49 travels through the first condensing lens 464 and the third condensing lens 468 sequentially, it is reflected by the mirror 462, which has an angle of about 45 degrees relative to a central axis 433 of the light tunnel 432. The reflected light travels along the central axis 433 and then travels through the second condensing lens 466 and the color wheel 44 to finally reach the front end 431 of the light tunnel 43. The coupled light beam 49 then travels through the rear end 432 and is processed by the optical engine 42. The processed image is projected outwards along the projection direction 422 of the projection lens 421 and is displayed onto a screen (not shown). The design of the light coupling module comes with the condensing and reflection device that can provide a certain intensity of light and precision of projection position. Especially, such an advantage is beneficial to the light projection before it reaches the color wheel 44 and the light tunnel 45. Thus, the light beam from the light tunnel 43 not only provides the same quality of color saturation as that of a single lamp structure, but also provides a better brightness in comparison to the single lamp structure.

With reference to FIG. 4, the hypothetic line that connects the center of the two light sources 47, 48 should be orthogonal to the projection direction 422 for extending the life cycle of the light source. The following will explain the arrangements.

First, the basic principle of the elliptic gas discharge lamp is briefly introduced. The elliptic gas discharge lamp comprises two electrodes opposite to each other. When an electric field is applied to the two electrodes, free electrons will be accelerated by the electric field. When the accelerated free electrons collide with the gas atoms, the gas atoms will absorb kinetic energy of the free electrons and bear an excited state. After the excited gas atoms return to the ground state, the absorbed energy is radiated, resulting in generated light. Meanwhile, heat will be released continuously during the operation of the gas discharge lamp. The heated gas rises up and gathers at the top region naturally between the two electrodes and form a high temperature region accordingly.

Figure 1:
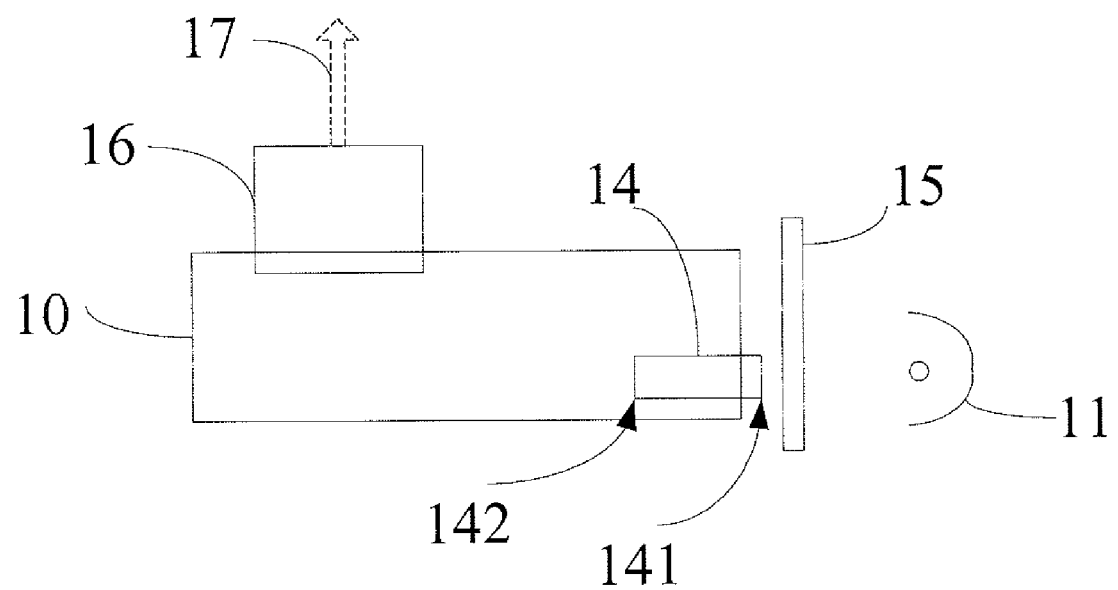
FIG. 1 illustrates a vertical schematic view of a projector apparatus with a single lamp structure of the prior art.
Figure 2:
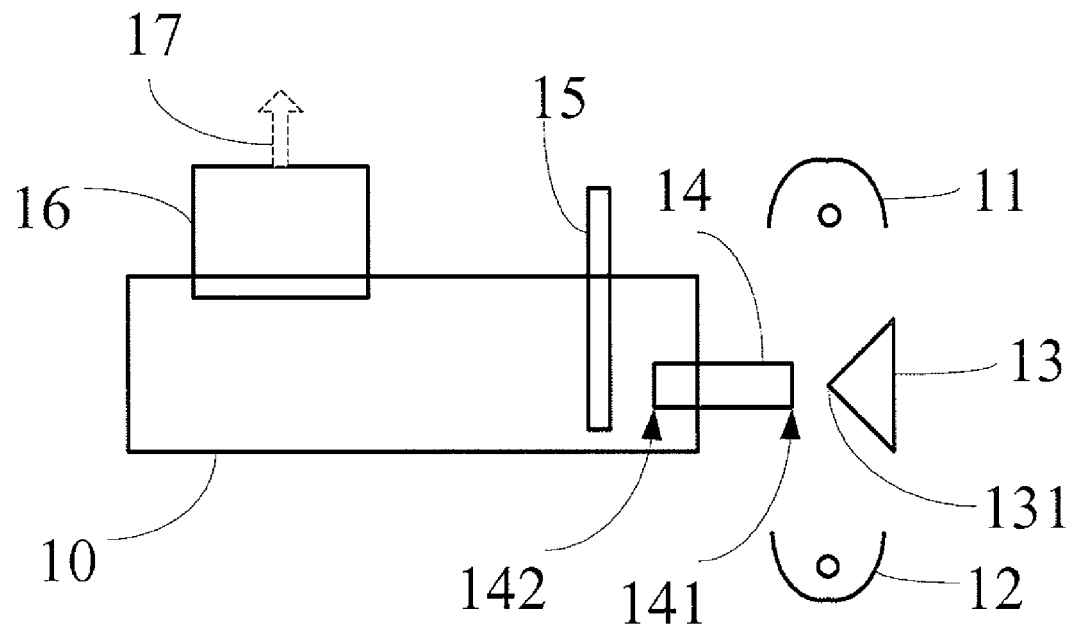
FIG. 2 illustrates a schematic view showing a projector apparatus with a dual lamp structure of the prior art.
Figure 3A:
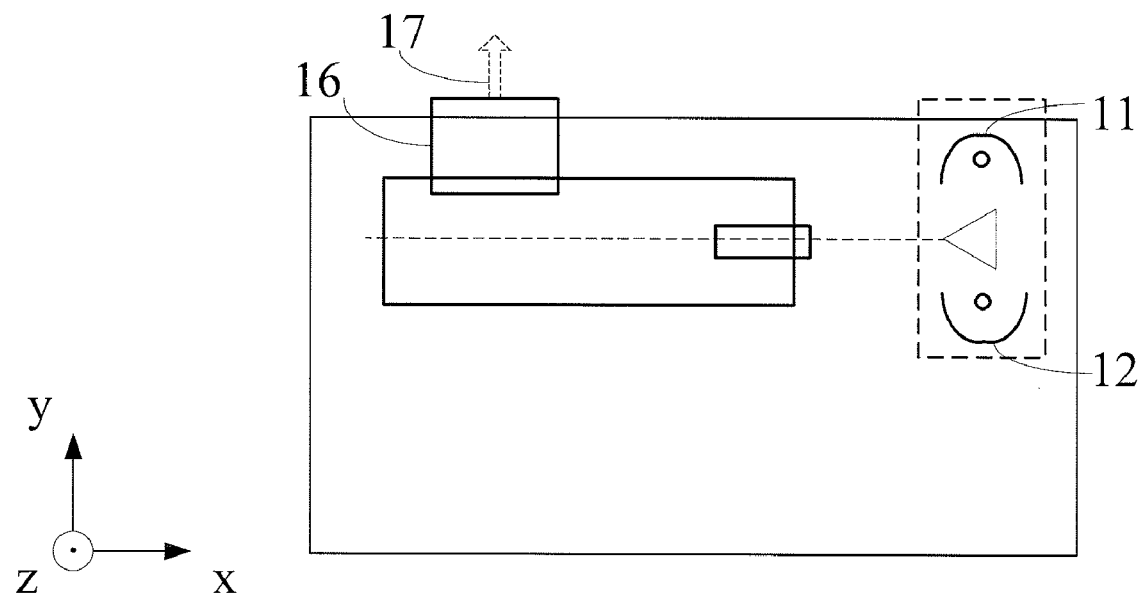
FIG. 3A illustrates another schematic view showing a projector apparatus with a dual lamp structure of the prior art.
Figure 3B:
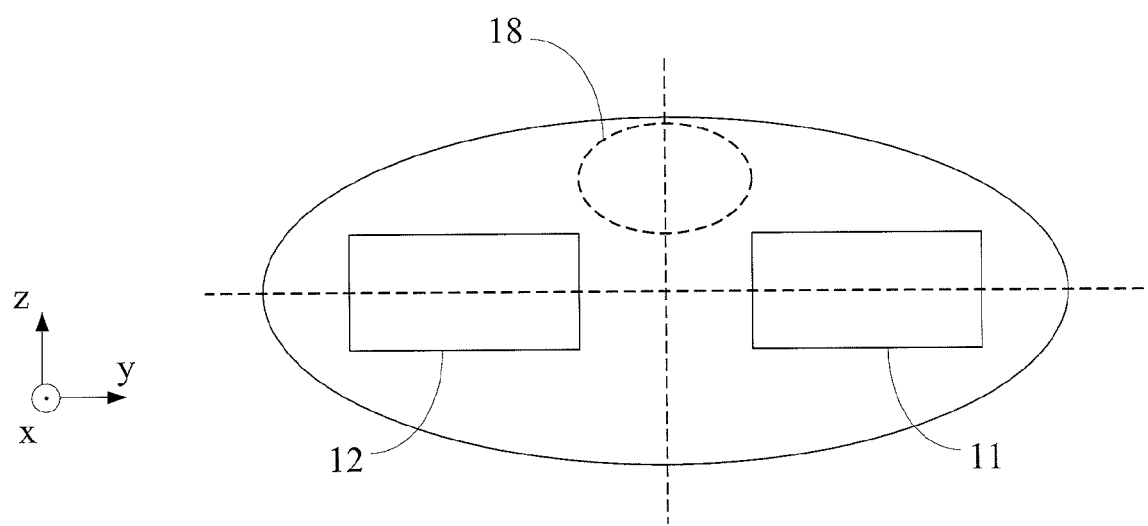
FIG. 3B schematically illustrates a high temperature region of a dual lamp structure of the prior art under a non-tilted situation.
Figure 3C:
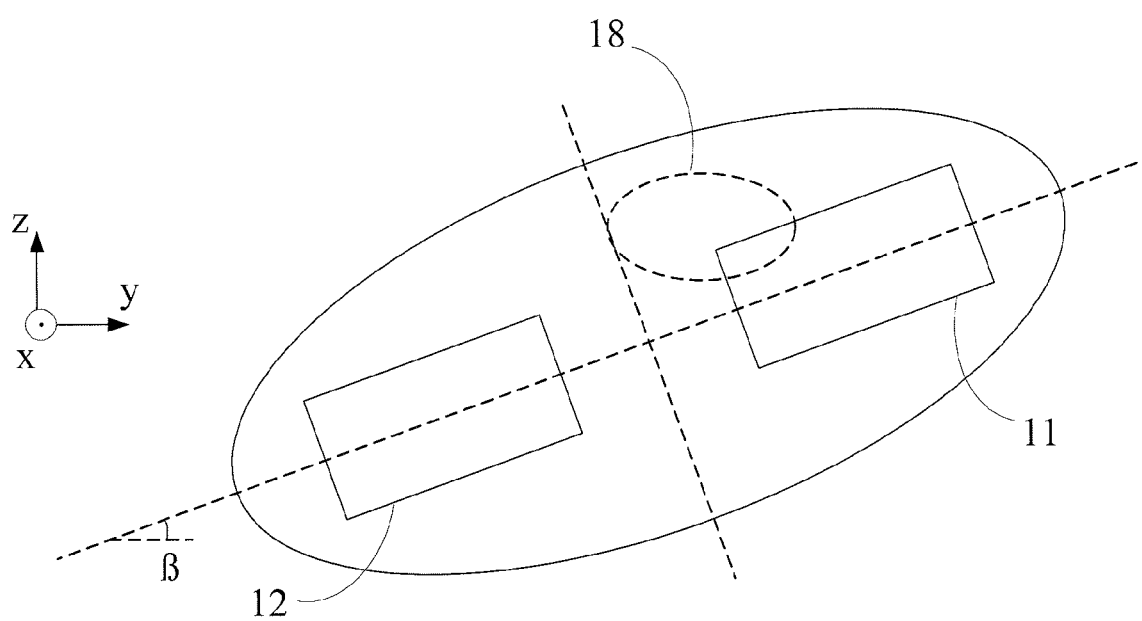
FIG. 3C schematically illustrates a high temperature region of a tilted dual lamp structure of the prior art.
Figure 5:
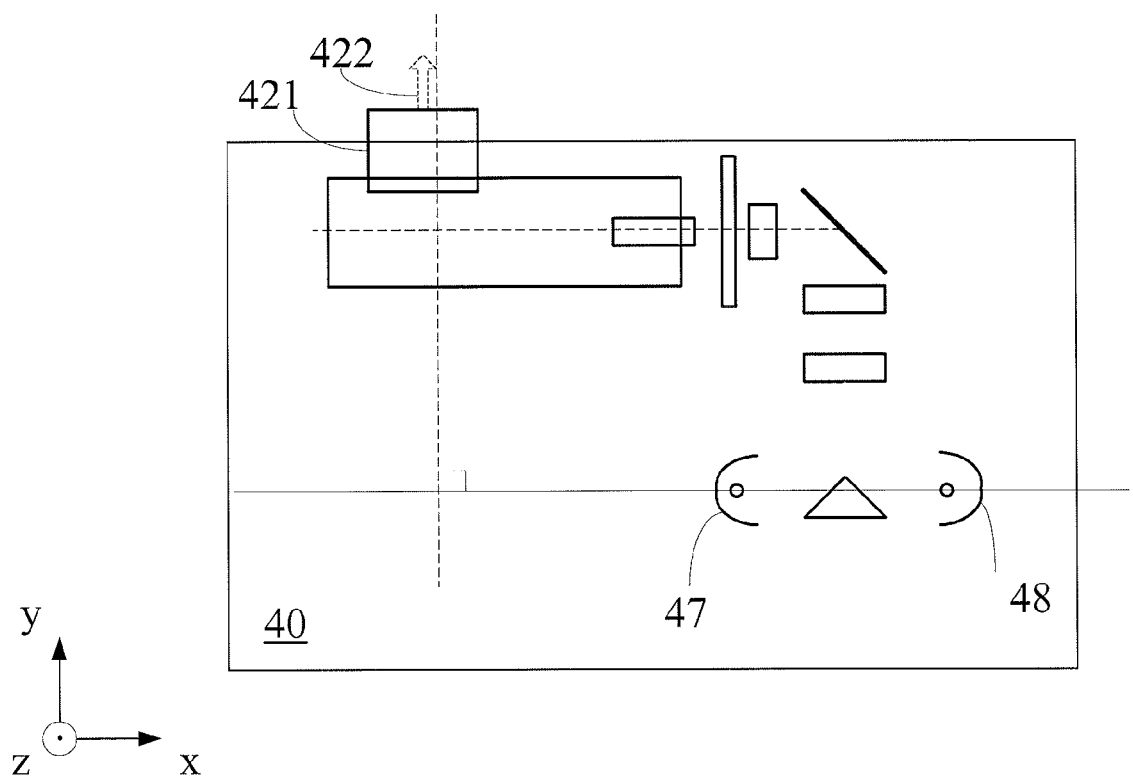
FIG. 5 illustrates a relationship between a projection direction and dual lamps in a projector apparatus of the present invention.

Lamp manufacturers usually request users not to tilt the elliptic lamp beyond 20 degrees upwards or downwards to prevent the electrodes from being in the high temperature region and causing lamp damage. With reference to FIG. 5, the connection line of the lamp bulbs of the two opposite elliptic lamps 47, 48 is substantially orthogonal to the projection direction 422 of the projection lens 421. In this arrangement, if the user needs to adjust the projection lens 421 by tilting it upwards or downwards, that is, tilt the projector apparatus along the x axis, the adjustments is in no sense to make the lamps 47, 48 rotate in an undesired direction because the rotation only occurs about the virtual rotating axis (x axis) formed by the hypothetic line connecting the two opposing elliptical lamps 47, 48. On the contrary, the elliptic lamps of the prior art has the potential to swing upwards or downwards in an undesired manner (as shown in FIG. 3C). Thus, the elliptic lamps of the projector apparatus of the invention would not reach a high temperature region or exceed a safe critical temperature as mentioned above. The life cycle of the lamps would also be efficiently extended.

Figure 6:
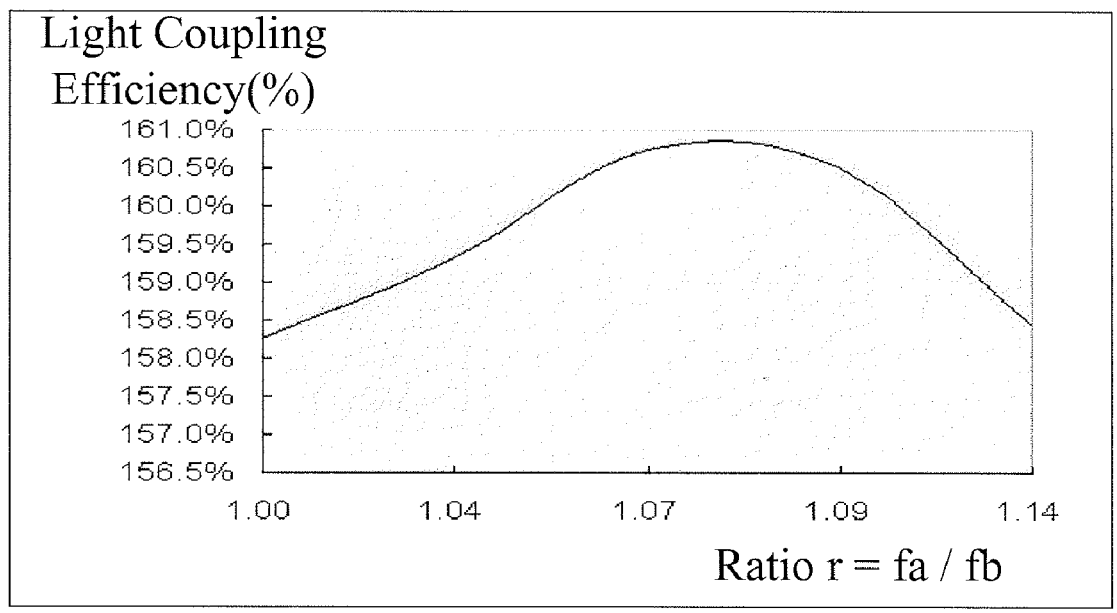
FIG. 6 is a diagram showing the ratio of the light coupling efficiency to the focal length of the present invention.

As mentioned above, in the preferred embodiment of the present invention, the third condensing lens 468 is disposed between the first condensing lens 464 and the mirror 462. The focal length of the first condensing lens 464 is f1, the focal length of the second condensing lens 466 is fb, and the focal length of the third condensing lens 468 is f3. The conjunct focal length f1 and f3 is fa. The relationship among fa, f1, and f3 is $$\frac{1}{fa} = \frac{1}{f1} + \frac{1}{f3} - \frac{d}{f1 f3},$$

wherein d represents the distance between the first condensing lens 464 and the third condensing lens 468. The ratio of the conjunct focal length, fa, to the focal length of the second condensing lens 466, fb, is r=fa/fb. FIG. 4 shows the relationship between the focal length ratio, r, and the light coupling efficiency, wherein the vertical axis represents the light coupling efficiency and the horizontal axis represents the focal length ratio r. By adjusting the position of the third condensing lens 468, the light coupling efficiency can be controlled. In FIG. 6, it shows that light coupling is more efficient when r is between the range of 1.07 and 1.09. Thus, compared with the prior art, the present invention is able to control the light coupling efficiency according to the users' requirements by solely adjusting the position of the third condensing lens 468.

Another embodiment of the present is to provide a light coupling module for implementing the functions mentioned above. The light coupling module comprises a prism, a first condensing lens, a second condensing lens, and a mirror. The light coupling module further comprises a third condensing lens for adjusting the position of the third condensing lens. Functions the light coupling module components are set forth in the above description. The details are not given here.

The above descriptions relate to the detailed technical contents and inventive features thereof, but do not limit the scope of the present invention. For example, the condensing lens can be replaced by other light condensing device with similar functions. The color wheel does not need to be disposed on the front end of the light tunnel. People skilled in this field may alternatively dispose the color wheel at the rear end of the light tunnel according to different situations. Thus, people skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projector apparatus with multi-light sources, comprising:
    a light incident region;
    a light tunnel, a color wheel, a light coupling module, and a plurality of light sources, all of which are disposed in the light incident region, and
    an image outgoing region being defined with a projection direction;
    wherein:
        the light coupling module has a light coupling device, a light gathering device, and a reflection device;
        the plurality of light sources having two light sources for providing two light beams, the two light beams being disposed on a hypothetic line which is substantially orthogonal to the projection direction, the two light beams substantially coupled into a single light beam by the light coupling device, and the two light beams projected from the two light sources to the light coupling device traveling the hypothetic line; and
        the single light beam travels along a direction which is substantially parallel to the projection direction before the single light beam is reflected by the reflection device, and the single light beam travels along a direction which is substantially orthogonal to the projection direction after the single light beam is reflected by the reflection device.

2. The projector apparatus with multi-light sources of claim 1, wherein the light coupling device is a prism.

3. The projector apparatus with multi-light sources of claim 1, wherein the light gathering device comprises a first condensing lens disposed on a front end of the reflection device and a second condensing lens disposed on a rear end of the reflection device.

4. The projector apparatus with multi-light sources of claim 3, wherein the light gathering device further comprises a third condensing lens disposed between the first condensing lens and the reflection device.

5. The projector apparatus with multi-light sources of claim 1, wherein the reflection device is a mirror.

6. The projector apparatus with multi-light sources of claim 5, wherein the plurality of light sources comprise two light sources.

7. The projector apparatus with multi-light sources of claim 6, wherein the light tunnel has a central axis, in which the single light beam traveling through the reflection device substantially travel along the central axis.

8. The projector apparatus with multi-light sources of claim 7, further comprising a projection lens disposed in the image outgoing region for projecting a processed image along the projection direction, wherein the angle between the central axis and the mirror is about 45 degrees, and the central axis is substantially orthogonal to the projection direction.

9. The projector apparatus with multi-light sources of claim 8, wherein the two light sources are disposed opposite to each other in view of the light coupling device, and the two light sources build up a virtual connection line between centers thereof, in which the connection line is substantially orthogonal to the projection direction.

10. The projector apparatus with multi-light sources of claim 1, wherein each of the light sources is a high intensity discharge (HID) lamp.

11. The projector apparatus with multi-light sources of claim 10, wherein each of the light sources is an elliptical lamp.

12. A light coupling module, adapted in a projector apparatus with multi-light sources, the projector apparatus with multi-light sources comprising a light incident region, a light tunnel, a color wheel, a plurality of light sources, and an image outgoing region, wherein the light tunnel, the color wheel and the light sources are disposed in the light incident region, and the image outgoing region is defined with a projection direction, the light coupling module comprising:
   a light coupling device;
   a light gathering device; and
   a reflection device,
      wherein the light sources have two light sources for providing two light beams, the two light beams are disposed on a hypothetic line which is substantially orthogonal to the projection direction, the two light beams substantially coupled into a single light beam by the light coupling device, in which the two light beams projected from the two light sources to the light coupling device travel along the hypothetic line; and the single light beam travels along a direction which is substantially parallel to the projection direction before the single light beam is reflected by the reflection device, and the single light beam travels along a direction which is substantially orthogonal to the projection direction after the single light beam is reflected by the reflection device.

13. The light coupling module of claim 12, wherein the light coupling device is a prism.

14. The light coupling module of claim 12, wherein the light gathering device comprises a first condensing lens disposed on a front end of the reflection device and a second condensing lens disposed on a rear end of the reflection device.

15. The light coupling module of claim 14, wherein the light gathering device further comprises a third condensing lens disposed between the first condensing lens and the reflection device.

16. The light coupling module of claim 12, wherein the reflection device is a mirror.

17. The light coupling module of claim 16, wherein the plurality of light sources comprises two light sources.

18. The light coupling module of claim 17, wherein the light tunnel comprises a central axis, in which the single light beam traveling through the reflection device substantially travel along the central axis.

19. The light coupling module of claim 18, further comprising a projection lens disposed in the image outgoing region for projecting a processed image along the projection direction, wherein the angle between the central axis and the mirror is about 45 degrees, and the central axis is substantially orthogonal to the projection direction.

20. The light coupling module of claim 18, wherein the two light sources are disposed opposite to each other in view of the light coupling device, and the two light sources build up a virtual connection line between centers thereof, in which the connection line is substantially orthogonal to the projection direction.

21. A projector apparatus with multi-light sources, comprising:
   a light incident region;
   a light tunnel, a color wheel, a light coupling module, and a plurality of light sources, all of which are disposed in the light incident region, and
   an image outgoing region being defined with a projection direction;
   wherein:
      the light coupling module has a light coupling device, a light gathering device, and a reflection device;
      two of the plurality of light sources provide two light beams, the two light sources are disposed opposite to each other and are disposed on a hypothetic line which is substantially orthogonal to the projection direction, the two light beams are substantially coupled into a single light beam by the light coupling device, and the two light beams projected from the two light sources to the light coupling device along two directions that are opposite to each other, in which the two directions travel along the hypothetic line; and
      the single light beam travels along a direction which is substantially parallel to the projection direction before the single light beam is reflected by the reflection device, and the single light beams travels along a direction which is substantially orthogonal to the projection direction after the single light beam is reflected by the reflection device.

* * * * *